(No Model.)
A. McI. WILLIAMSON.
Carriage Wheel.
No. 233,311. Patented Oct. 12, 1880.
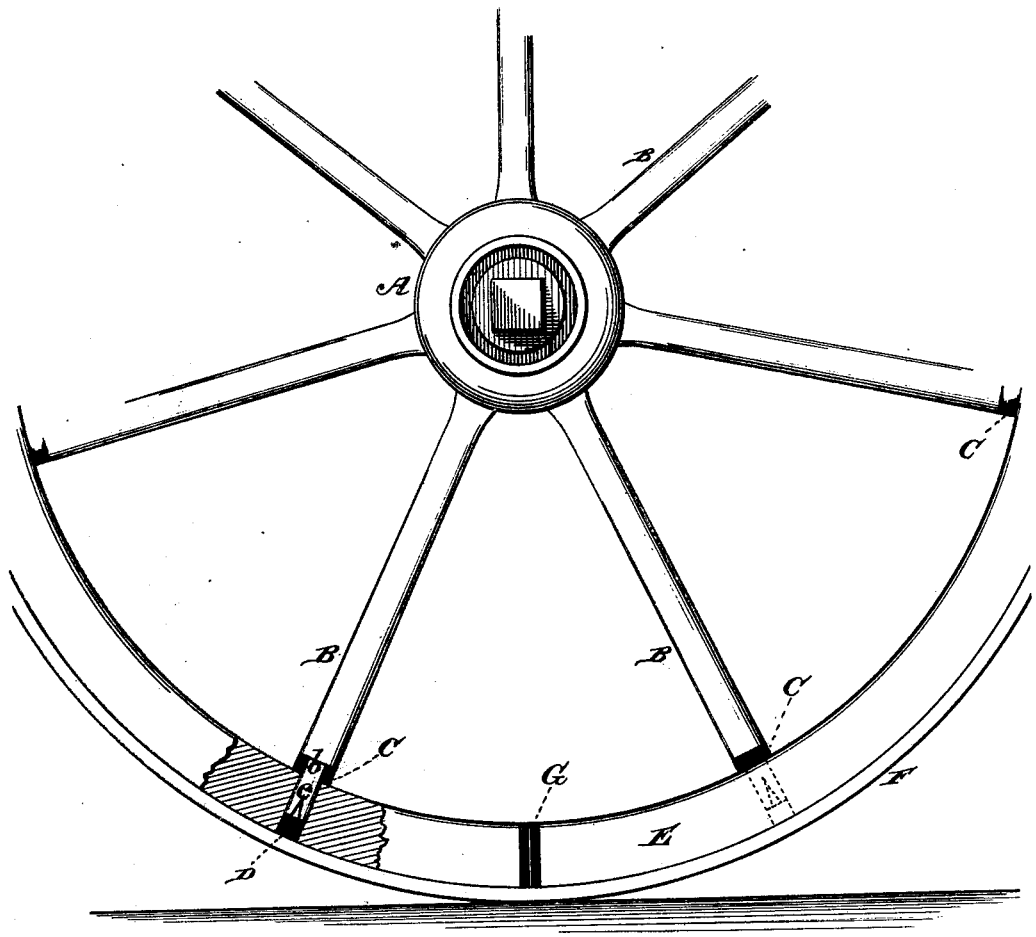
WITNESSES
Robert Everett
James J. Sheehy
INVENTOR
A McIntosh Williamson
Gilmore, Smith & Co,
ATTORNEYS

United States Patent Office.

A. McINTOSH WILLIAMSON, OF PHILADELPHIA, PENNSYLVANIA.

CARRIAGE-WHEEL.

SPECIFICATION forming part of Letters Patent No. 233,311, dated October 12, 1880.

Application filed April 5, 1880. (No model.)

*To all whom it may concern:*

Be it known that I, A. McINTOSH WILLIAMSON, of Philadelphia, in the county of Philadelphia and State of Pennsylvania, have invented certain new and useful Improvements in Carriage-Wheels; and I do hereby declare that the following is a full, clear, and exact description of the construction and operation of the same, reference being had to the annexed drawing, making a part of this specification, and to the letters and figures of reference marked thereon.

The drawing is a representation of a side elevation of a carriage-wheel, partly broken away to show my improvements.

The nature of my invention relates to the construction of wheels for vehicles.

The essential features of the improvement relate to means for securing elasticity of the wheel, the parts connected being allowed to have a certain amount of play, which will prevent breakage of the wheel in striking or passing over any obstacle upon the road. It also admits of each spoke receiving its share of the jar incident to driving the vehicle over pavements or rough roads. Many other advantages might be enumerated, but these will all be apparent to those skilled in the art. It will be noticed, however, that the fellies are not weakened by mortises having metal sockets set into them, as has been done in a former instance.

In the drawing, which fully illustrates my invention, A designates the hub of the wheel, and B B the spokes.

The spokes have elastic rings C, which fit against the fellies E, and the tenons $b$ of the spokes, which pass into mortises in the fellies, come against elastic cylindrical or other equivalent-shaped pads D, which are fitted in the mortises in the fellies.

The tire F, which is passed around the fellies of the wheel, compresses to some extent the elastic pads D, thus tending to keep the fellies in their original form and symmetry, relieving the spoke from springing through careless hooping of the wheel, taking up the expansion incident to light tires from hot weather, and giving to wood-wheeled vehicles, to a greater extent, the results derived from the ordinary springs.

At the points of juncture between the fellies elastic plates G are interposed, these plates being fitted to the ends of the fellies. These elastic plates or pads constitute auxiliaries to the previously-mentioned pads, and tend to keep the wheel from breaking or becoming rim-bound. The pads, which are set against the tenons of the spokes, also act as a preventive against the breakage of the wheel, and will further accommodate themselves to the contraction or expansion of the tire.

The mortises or holes through the fellies or bent rims are made round, so that the tenons will fit into them, and the elastic pads or cushions are made of cylindrical shape, so as to fit into the said round holes of the fellies. The end of the spoke is more securely held to the felly by a wedge, $e$, driven into the end of the spoke to spread it in a well-known manner, and the said wedge will also serve an important function to compress the cushion-rings C, so as to allow them a limited degree of elasticity only, which is regulated by the distance the wedge is driven into the end of the spoke.

Having thus described my invention, what I claim, and desire to secure by Letters Patent, is—

The carriage-wheel as described, constructed with the elastic pads interposed between the spokes and the fellies, between the ends of the spoke-tenons and the tire, and between the meeting ends of the fellies, substantially as and for the purpose specified.

In testimony that I claim the above I have hereunto subscribed my name in the presence of two witnesses.

A. McINTOSH WILLIAMSON.

Witnesses:
ROBERT EVERETT,
JAS. J. SHEEHY.